(12) United States Patent
Chan

(10) Patent No.: US 7,542,220 B2
(45) Date of Patent: Jun. 2, 2009

(54) CAMERA MODULE ASSEMBLY AND METHOD FOR ASSEMBLING SAME

(75) Inventor: Fu-Chieh Chan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/836,733

(22) Filed: Aug. 9, 2007

(65) Prior Publication Data

US 2008/0239525 A1    Oct. 2, 2008

(30) Foreign Application Priority Data

Apr. 2, 2007    (CN) .................... 2007 1 0200377

(51) Int. Cl.
*G02B 7/02*    (2006.01)
*G03B 17/24*    (2006.01)

(52) U.S. Cl. .................. 359/811; 359/819; 396/311

(58) Field of Classification Search .......... 359/694–822; 396/311, 529

See application file for complete search history.

(56) References Cited

U.S. PATENT DOCUMENTS

| 6,404,568 | B2 * | 6/2002 | Noguchi | 359/823 |
| 7,190,533 | B2 * | 3/2007 | Nakamura | 359/811 |
| 7,352,516 | B2 * | 4/2008 | Tsuji | 359/699 |
| 2006/0181633 | A1 | 8/2006 | Seo | |

* cited by examiner

*Primary Examiner*—Mohammed Hasan
(74) *Attorney, Agent, or Firm*—Zhigang Ma

(57) ABSTRACT

A camera module (200) includes a lens barrel (202), at least one lens (204), a holder (206), and a base (210). The at least one lens is received in the lens barrel. The holder has a first end (212) and a second end (214). The holder further has a cavity (216) defined through the first end and the second end thereof. The first end holds the lens barrel. The second end is provided with at least two supporting protrusions (222) extending therefrom along a direction away from the first end of the holder. The base fixedly contacts with the at least two supporting protrusions. A method for assembling a camera module is also provided.

19 Claims, 7 Drawing Sheets

CAMERA MODULE ASSEMBLY AND METHOD FOR ASSEMBLING SAME

BACKGROUND

1. Field of the Invention

The present invention relates to camera modules and, particularly, to an inexpensive and compact camera module and a method for assembling the same.

2. Description of Related Art

Nowadays, camera modules are now in widespread use. Camera modules are being combined with various portable electronic devices, such as mobile phones, PDAs (personal digital assistants), and computers, to be increasingly multi-functional. Furthermore, such camera modules need to satisfy requirements of compactness, low cost, and excellent optical performance in order to succeed in the marketplace. However, due to the minimal amount of space available for such camera modules, meeting all those requirements has been hard to achieve.

Referring to FIGS. 1 and 2, a typical camera module 100 is shown. The camera module 100 includes a lens barrel 102, a holder 104, an image sensor 106, a glass plate 108, and a circuit board 110. The lens barrel 102 has threads 112 defined on an outer wall thereof. The holder 104 has a cavity 114 therein and threads 116 defined on an inner wall thereof. The lens barrel 102 is engaged with the inner wall of the holder 104 by a threaded engagement. The image sensor 106 is attached to and electrically connected with the circuit board 110. The image sensor 106 is selectably exposed to light via the lens barrel 102. The glass plate 108 covers the image sensor 106. The holder 104 is coupled to the circuit board 110 for housing the image sensor 106. In this way, the image sensor 106 is protected from dust.

Generally, during assembly of the camera module 100, the holder 104 is attached to the circuit board 110. Therefore, additional surface area of the circuit board 110 has been needed to facilitate sufficient bonding area with the holder 104. This use of valuable circuit board surface has effectively required a larger circuit board 110 to be used, ultimately increasing both the size and cost of the camera module.

What is needed, therefore, is to provide a camera module with requirements of compactness and low cost.

SUMMARY

In a present embodiment, a camera module includes a lens barrel, at least one lens, a holder, and a base. The at least one lens is received in the lens barrel. The holder has a first end and a second end and has a cavity defined therein. The cavity extends through the first end and the second end. The first end holds the lens barrel. The second end is provided with at least two supporting protrusions extending directly therefrom, along a direction pointing away from the first end of the holder. The base contacts with the at least two supporting protrusions and is held in place thereby.

In another present embodiment, a method for assembling a camera module includes the steps of: receiving at least one lens in a lens barrel; engaging the lens barrel with a holder, the holder having a first end configured for holding the lens barrel and having a second end provided with at least two supporting protrusions integrally extending therefrom along a direction away from the first end of the holder, the holder defining a cavity therein, the cavity extending through the first end and the second end; and attaching each support protrusion to a base so that the holder fixedly contacts with the base.

Advantages and novel features will become more apparent from the following detailed description of the present camera module and its related assembling method, when taken in conjunction with the accompanying drawings.

BRIEF DESCRIPTION OF THE DRAWINGS

Many aspects of the present camera module and its related assembling method can be better understood with reference to the following drawings. The components in the drawings are not necessarily drawn to scale, the emphasis instead being placed upon clearly illustrating the principles of the present camera module and its related assembling method. Moreover, in the drawings, like reference numerals designate corresponding parts throughout the several views.

Figure 1:
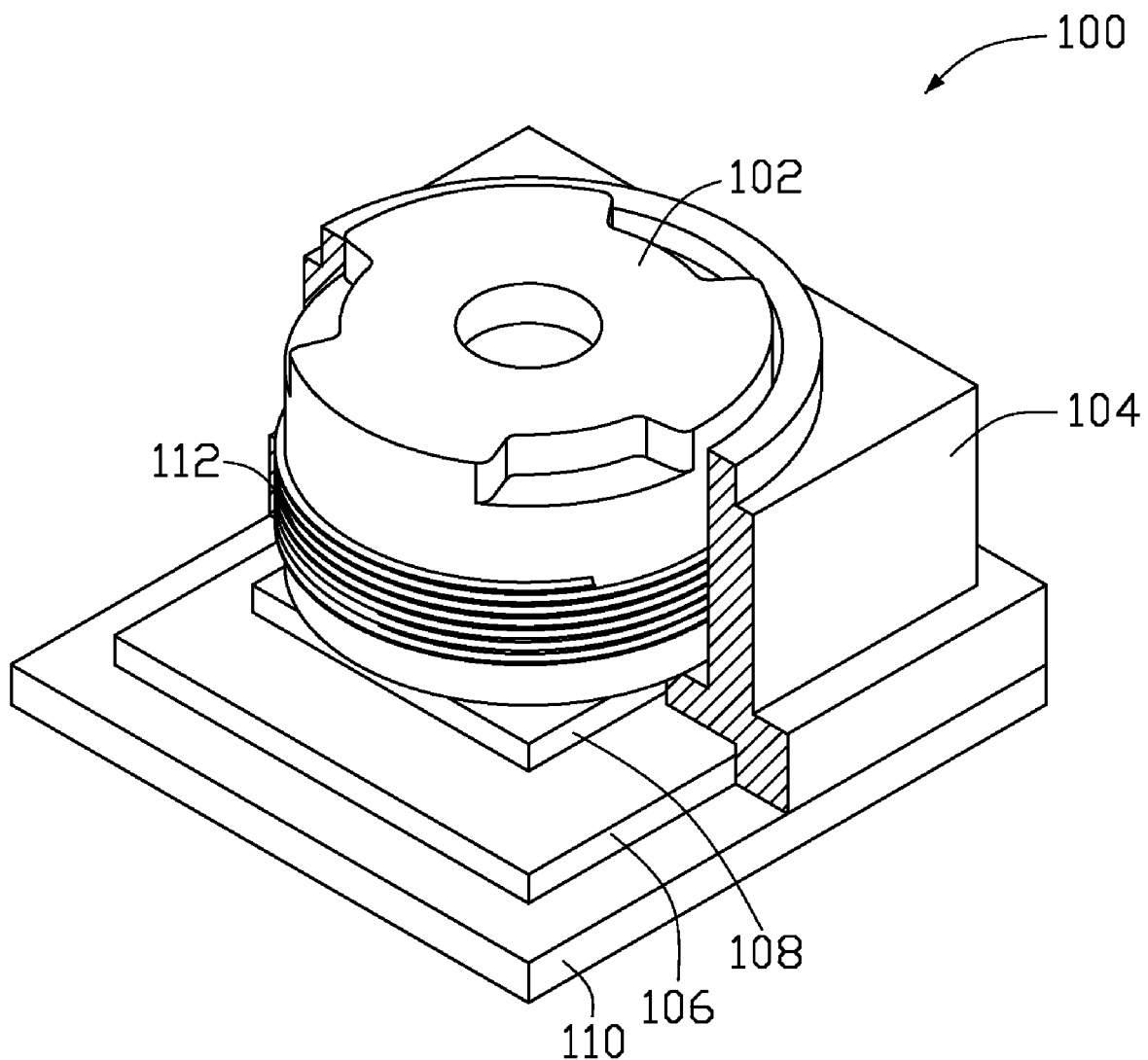
FIG. 1 is a cut-away view of a typical camera module.
Figure 2:
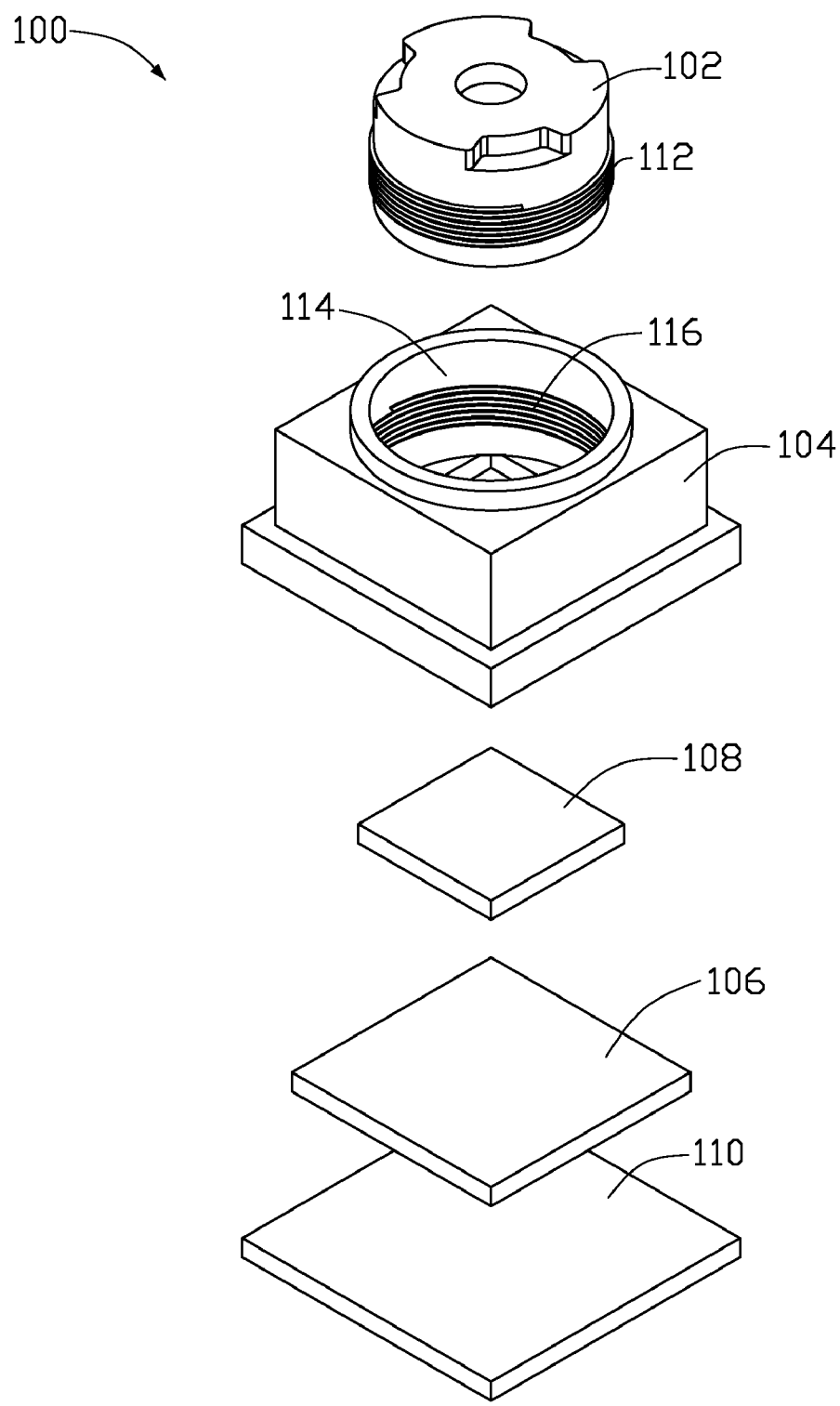
FIG. 2 is an exploded perspective view of the camera module shown in FIG. 1.

Corresponding reference characters indicate corresponding parts throughout the drawings. The exemplifications set out herein illustrate at least one preferred embodiment of the present camera module and its related assembling method, in one form, and such exemplifications are not to be construed as limiting the scope of the invention in any manner.

DETAILED DESCRIPTION OF THE INVENTION

Reference will now be made to the drawings to describe at least one preferred embodiment of the present camera module and its related assembling method.

Figure 3:
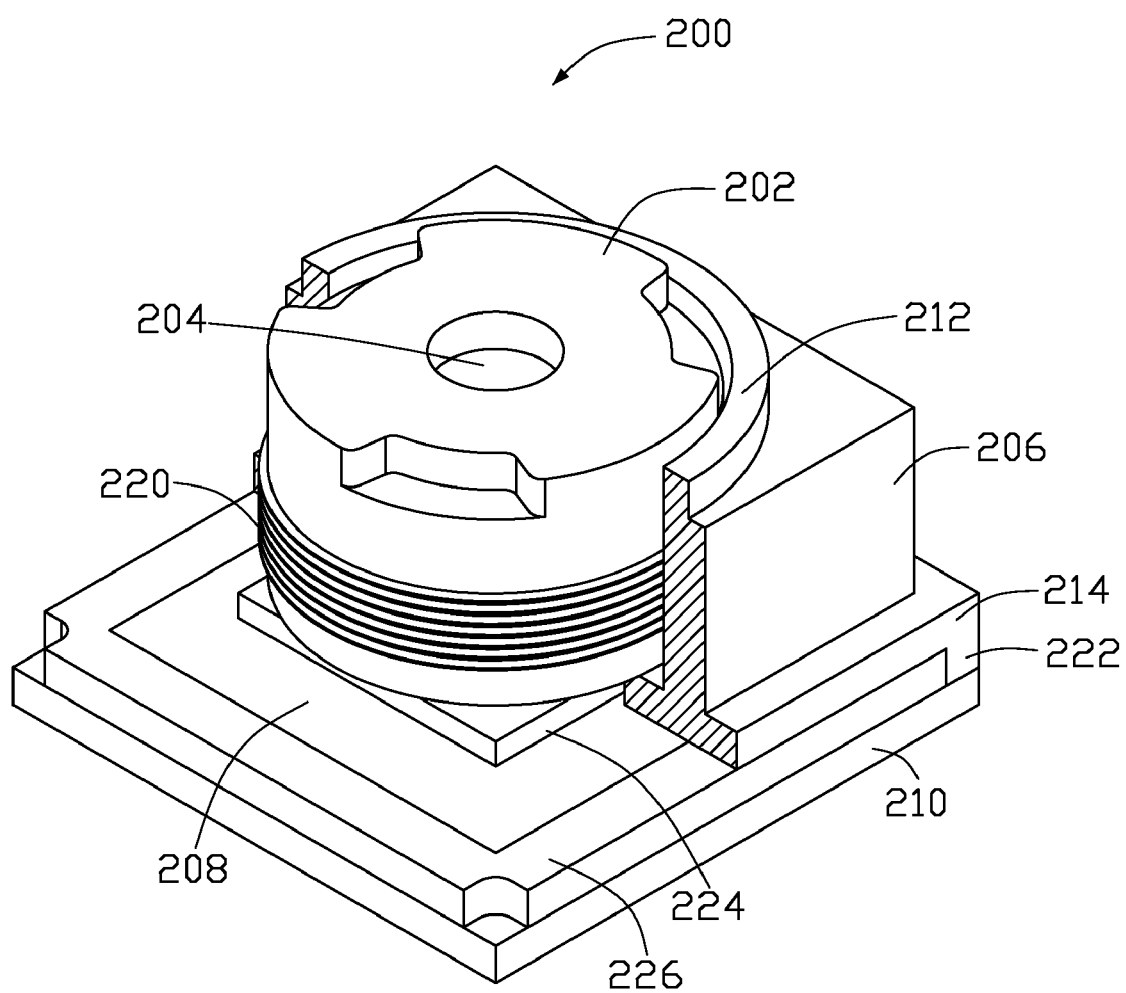
FIG. 3 is a cut-away view of a camera module according to a first present embodiment.
Figure 4:
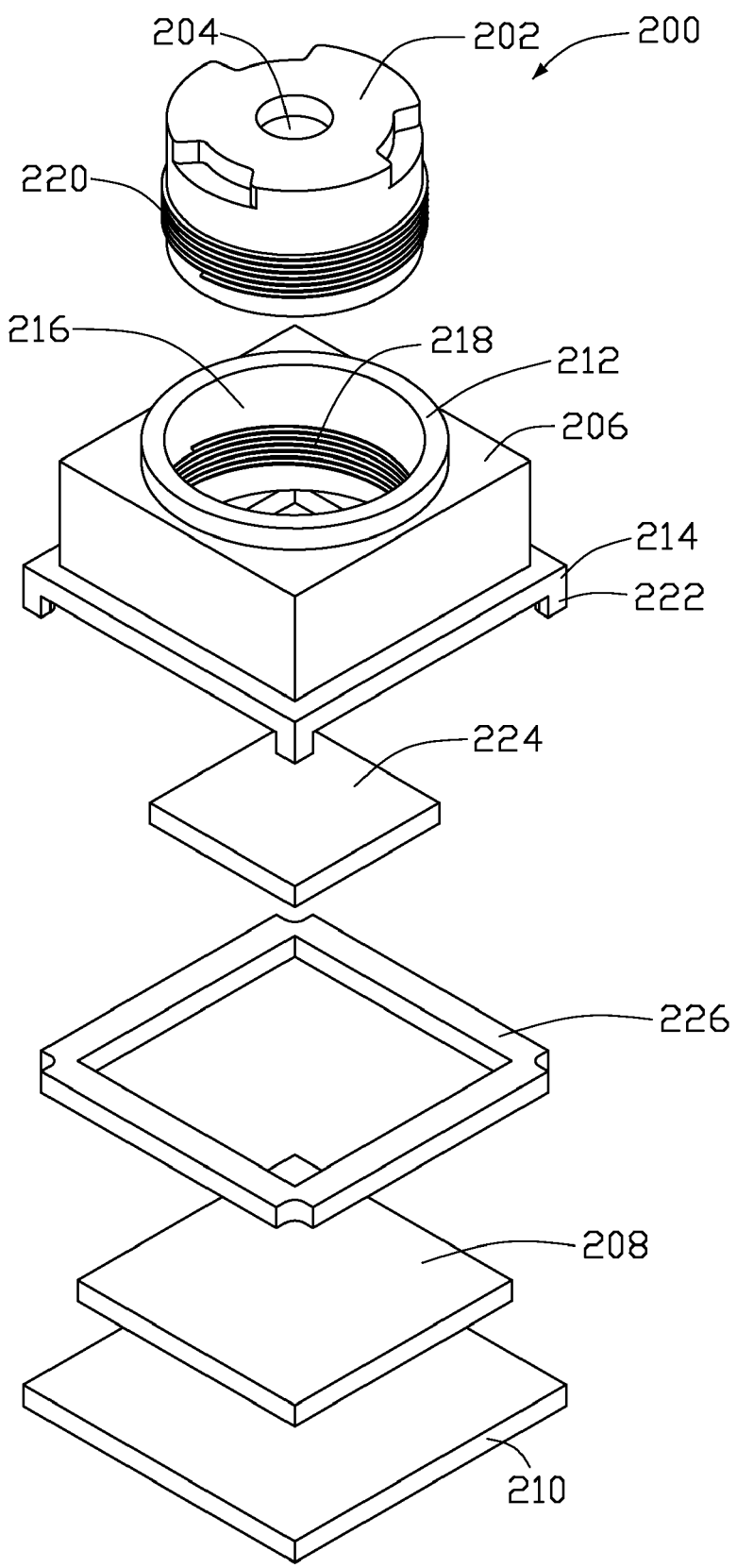
FIG. 4 is an exploded perspective view of the camera module shown in FIG. 3.

Referring to FIGS. 3 and 4, a camera module 200, according to a first present embodiment, is shown. The camera module 200 includes a lens barrel 202, at least one lens 204, a holder 206, a sensor 208, and a base 210. The sensor 208 is attached to the base 210 and is exposed to light traveling through the at least one lens 204. In this present embodiment, the base 210 is a circuit board electrically connected to the sensor 208. The sensor 208 is, usefully, a CCD (coupled-charge device) sensor or a CMOS (complementary metal-oxicle semiconductor) sensor.

The at least one lens 204 is received in the lens barrel 202. The material of the at least one lens 204 is, advantageously, an optical glass or plastic. The holder 206 has a first end 212 and a second end 214 and has a cavity 216 defined therein. The cavity 216 extends through the first end 212 and the second end 214.

The first end 212 has threads 218 defined on an inner wall thereof, and the lens barrel 202 has threads 220 defined on an outer wall thereof. Accordingly, the lens barrel 202 is engaged with the inner wall of the first end 212 by threading.

The second end 214 is provided with at least two supporting protrusions 222 extending integrally/directly therefrom, along a direction pointing/oriented away from the first end 212 of the holder 206. Beneficially, the protrusion extension direction is parallel to the optical/longitudinal axis of the holder 206. In this present embodiment, the number of the supporting protrusions 222 is four. The second end 214 is square and the four supporting protrusions 222 are respectively located on/at the four corners of the second end 214. The base 210 fixedly contacts with the four supporting protrusions 222, at least in part due to a friction fit therebetween and, potentially, with the aid of an adhesive or another attachment/bonding means. Therefore, the holder 206 is attached to the base 210 by the four supporting protrusions 222. In fact, in the illustrated embodiment, the base 210 and the four supporting protrusions 222 are configured such that the protrusions 222 are respectively matingly and fittingly received within the corners of the base 210 and are shaped so as to complete the otherwise square shape of the base 210. By actually being received in the corners of the base 210 in this manner, the protrusions 222 further aid in maintaining the alignment of the base 210 relative to the holder 206, while limiting the area (not the volume, of course) occupied by the holder to essentially that of the base 210.

In this present embodiment, the four supporting protrusions 222 are integrated with the holder 206. Alternately, the four supporting protrusions 222 may be separate from the holder 206 and attached thereto the second end 214 of the holder 206 by adhesive, welding (e.g., plastic welding), or other attaching method. Each supporting protrusion 222 is, usefully, of essentially identical height to promote even loading thereon. A cross sectional shape of the four supporting protrusions 222 is selected from the group comprised of square, rectangular, triangular, at least partially circular/arcuate, and fractionally beveled (e.g., as per FIGS. 3 and 4). Advantageously, the portion of a given protrusion 222 that is to be positioned adjacent a corresponding corner of the base 210 is particularly configured/shaped to matingly fit with such corresponding corner.

A transparent component 224, such as an infrared filter, is provided between the sensor 208 and the lens barrel 202 and is configured for protecting an exposure area of the sensor 208 and filtering light from the at least one lens 204. Opportunely, the transparent component 224 is directly attached to the sensor 208. Alternately, the transparent component 224 may be fixed to an inner wall of the second end 214. The transparent component 224 can be an optical glass plate or other such transparent element.

A colloid layer 226 is advantageously provided between the holder 206 and the base 210, so as to surround the sensor 208. Rather appropriately, the colloid layer 226 is a thermo-setting adhesive. The effect of the colloid layer 226 is to protect the electrical elements including the sensor 208 on the base 210 (i.e., the colloid layer 226 acts as an environmental seal, reducing the opportunity for contamination of the electrical elements). It is to be understood that the area of the base 210 that is adjacent to/in contact with the colloid layer 226 can still be used for circuitry purposes, thus maximizing the available base area for such purposes. Thus, the amount of space/volume needed to make an operable camera module 200 can be reduced, relative to previously available versions.

Figure 5:
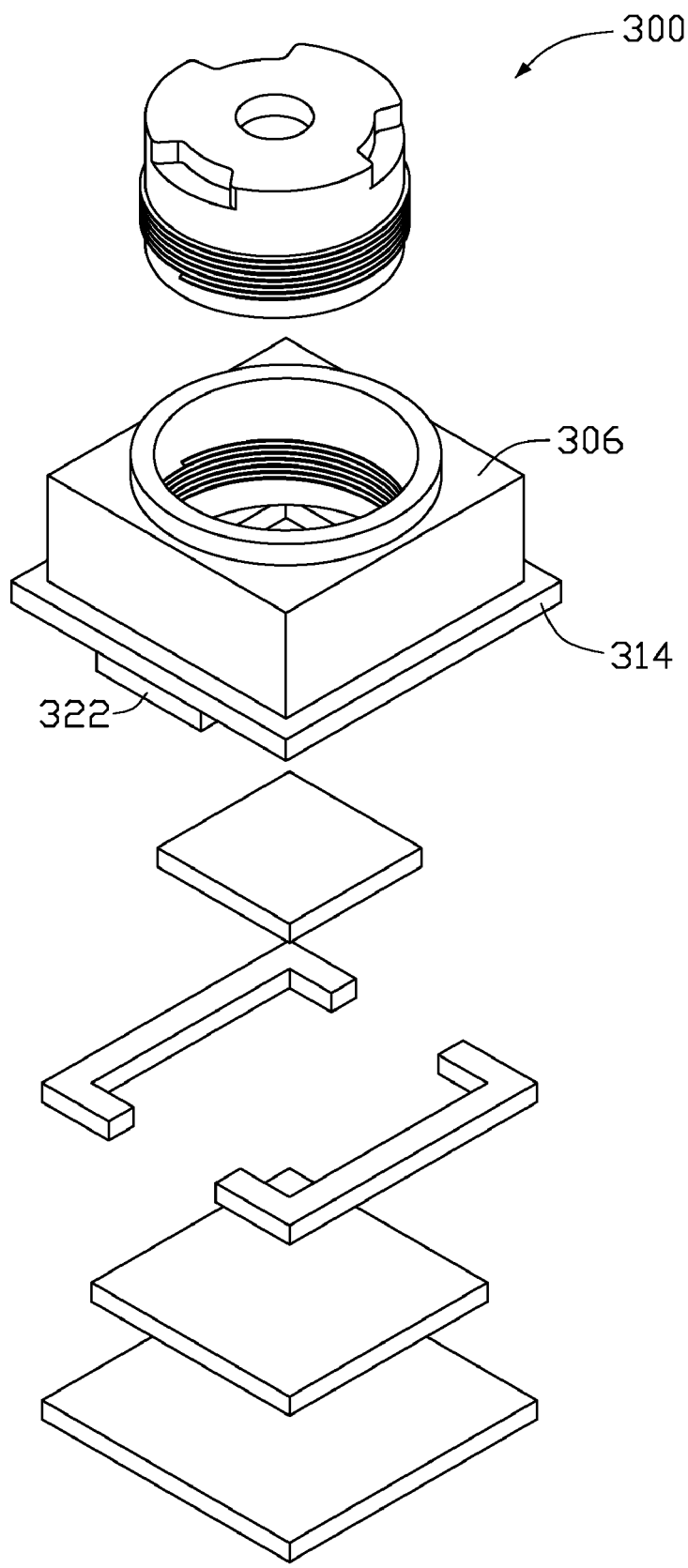
FIG. 5 is an exploded perspective view of a camera module, according to a second present embodiment.
Figure 6:
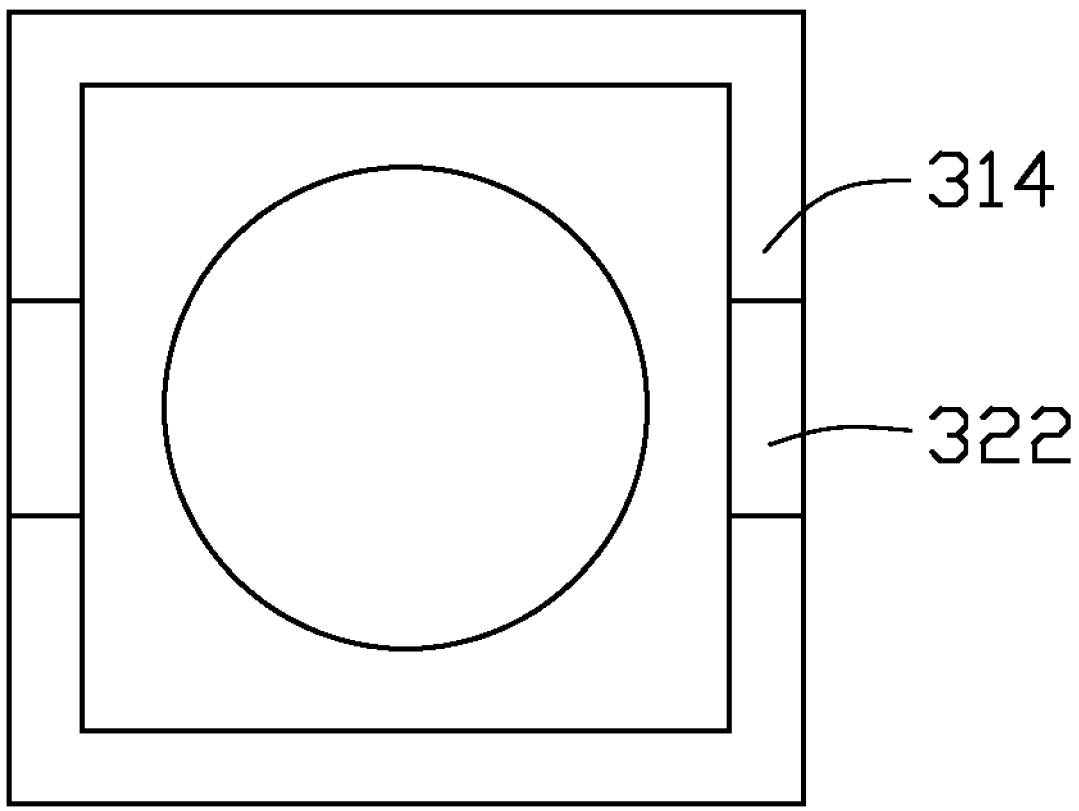
FIG. 6 is a bottom view of a holder, provided with supporting protrusions as shown in FIG. 5.

Referring to FIGS. 5 and 6, a camera module 300, according to a second present embodiment, is shown. Differences between the camera module 300 of the second present embodiment and the camera module 200 of the first present embodiment are that the number of the support protrusions 322 in the camera module 300 is two and are respectively located on two opposite edges of the second end 314 of the holder 306. Each supporting protrusion 322 is a rectangular parallelepiped in shape, with essentially identical height. A length of each supporting protrusion 322 is less than that of the edge of the second end 314. A pair of square-bracket-shaped colloid layer elements (not labeled) are provided, one on either respective side of the pair of protrusions 322, in order to protect the sensor (also not labeled).

Figure 7:
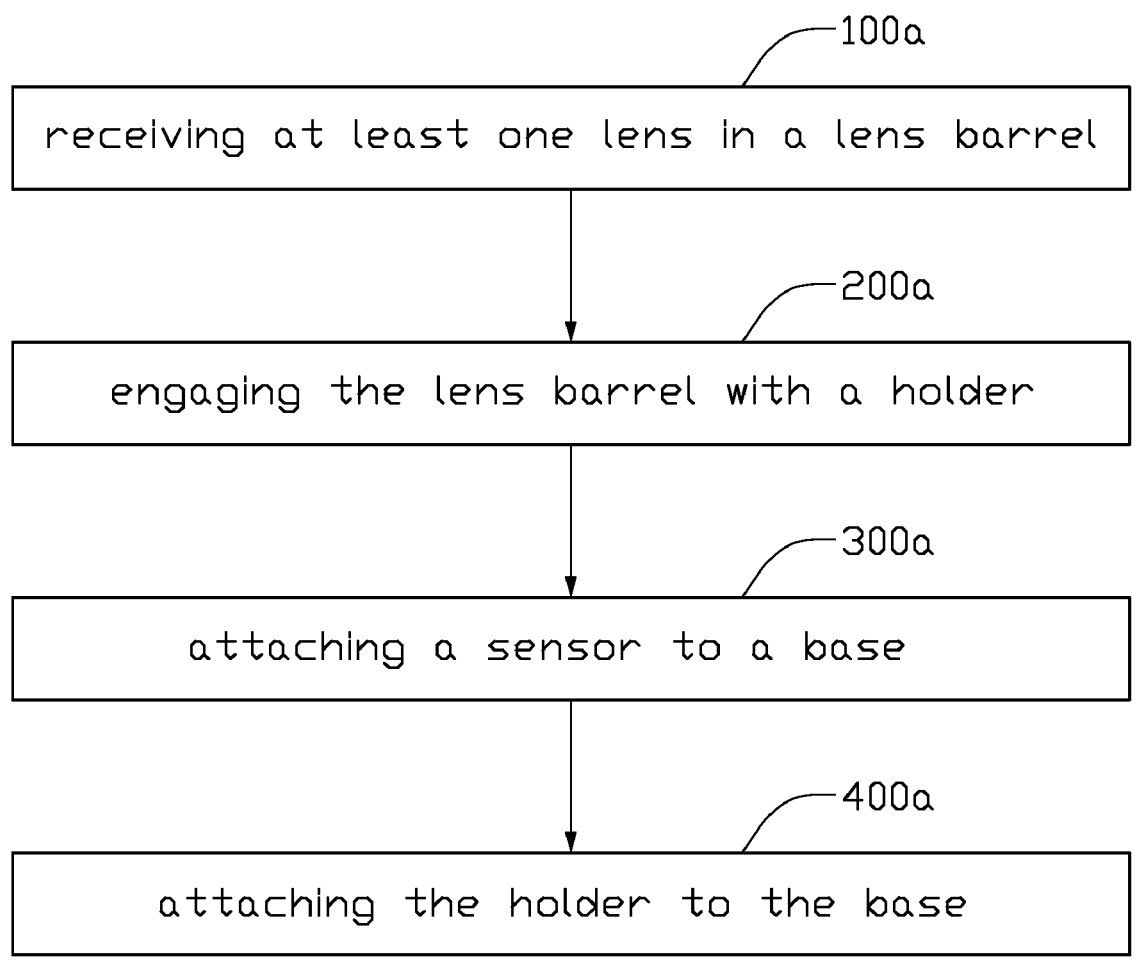
FIG. 7 is a flow chart of a method for assembling a camera module, according to a third present embodiment.

Referring to FIG. 7, a method for assembling the camera module 200 is shown. The method includes the steps of:
(100a) receiving at least one lens 204 in a lens barrel 202;
(200a) engaging the lens barrel 202 with a holder 206;
(300a) attaching a sensor 208 to a base 210; and
(400a) attaching the holder 206 to the base 210.

In the step (100a), material of the at least one lens 204 is an optical glass or plastic. The lens barrel 202 has threads 220 defined on an outer wall thereof.

In the step (200a), the lens barrel 202 is engaged with the inner wall of the first end 212 by the threads 218.

In the step (300a), the sensor 208 is electrically connected to the base 210, such as a circuit board. A transparent component 224 is attached to the sensor 208 directly, and a colloid layer 226 is provided between the holder 206 and the base 210 so as to surround the sensor 208.

In the step (400a), the base 210 is contacted with the four supporting protrusions 222. Therefore, the holder 206 is attached to the base 210 by the four supporting protrusions 222 and held fixedly in place thereby. The protrusions 222 can, advantageously, be permanently affixed to the base by, e.g., an adhesive, plastic welding, and/or other attachment means.

Since the second end of the holder is provided with at least two supporting protrusions, when attaching the holder to the base, such as a circuit board, the holder is attached to the base by the at least two supporting protrusions. Therefore, additional surface area of the base is reduced for the base. This complies with the requirements for compactness and reduced expense.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A camera module, comprising:
a lens barrel;
at least one lens received in the lens barrel;
a holder having a first end for holding the lens barrel and a second end provided with at least two supporting protrusions extending therefrom, each protrusion oriented away from the first end of the holder, the holder defining a cavity therein, the cavity extending through the first end and the second end; and
a base fixedly contacting with the at least two supporting protrusions.

2. The camera module as claimed in claim 1, wherein the at least two supporting protrusions are integral with the holder.

3. The camera module as claimed in claim 1, wherein the at least two supporting protrusions are separate from the holder, and the at least two supporting protrusions are attached to the second end of the holder.

4. The camera module as claimed in claim 1, further comprising a sensor attached to the base.

5. The camera module as claimed in claim 4, further comprising a transparent component provided between the sensor and the lens barrel.

6. The camera module as claimed in claim 5, wherein the transparent component is an infrared filter attached to the sensor.

7. The camera module as claimed in claim 5, wherein the transparent component is a glass plate attached to the sensor.

8. The camera module as claimed in claim 5, wherein the transparent component is an infrared filter fixed to an inner wall of the second end.

9. The camera module as claimed in claim 4, further comprising a colloid layer surrounding the sensor.

10. The camera module as claimed in claim 9, wherein the colloid layer is a thermosetting adhesive.

11. The camera module as claimed in claim 4, wherein the base is a circuit board electrically connected to the sensor.

12. The camera module as claimed in claim 1, wherein a cross section of the at least two supporting protrusions is selected from a group comprising of a square, a rectangle, a triangle, a circle, an at least partially arcuate element, and an at least partially beveled element.

13. A method for assembling a camera module, comprising the steps of:
   receiving at least one lens in a lens barrel;
   engaging the lens barrel with a holder, the holder having a first end configured for holding the lens barrel and a second end provided with at least two supporting protrusions, each protrusion extending therefrom along a direction away from the first end of the holder, the holder defining a cavity therein, the cavity extending through the first end and the second end; and
   attaching the at least two support protrusions to a base so that the holder fixedly contacts with the base.

14. The method as claimed in claim 13, wherein the at least two supporting protrusions are integral with the holder.

15. The method as claimed in claim 13, wherein the at least two supporting protrusions are separate from the holder, and the at least two supporting protrusions are attached to the second end.

16. The method as claimed in claim 13, wherein the first end has threads defined on an inner wall thereof, the lens barrel has threads defined on an outer wall thereof, and, thereby, the lens barrel is threadedly engaged with the inner wall of the first end.

17. The method as claimed in claim 13, further comprising attaching a sensor to the base before the step of attaching the second end to the base.

18. The method as claimed in claim 13, wherein the base is a circuit board electrically connected to the sensor.

19. A camera module, comprising:
   a lens barrel having threads defined on an outer wall thereof;
   at least one lens received in the lens barrel;
   a holder having a first end for holding the lens barrel and a second end provided with at least two supporting protrusions extending therefrom, each protrusion oriented away from the first end of the holder, the holder defining a cavity therein, the cavity extending through the first end and the second end, the first end having threads defined on an inner wall thereof, the lens barrel thereby threadedly engaging with the inner wall of the first end; and
   a base fixedly contacting with the at least two supporting protrusions.

* * * * *